United States Patent
Nishimura et al.

(10) Patent No.: US 11,448,319 B2
(45) Date of Patent: Sep. 20, 2022

(54) COMPOSITION FOR GAS SEAL MEMBER AND METHOD OF PRODUCING SAME, GAS SEAL MEMBER FOR HIGH-PRESSURE HYDROGEN DEVICE, AND HIGH-PRESSURE HYDROGEN DEVICE

(71) Applicants: KYUSHU UNIVERSITY, NATIONAL UNIVERSITY CORPORATION, Fukuoka (JP); ZEON CORPORATION, Tokyo (JP)

(72) Inventors: Shin Nishimura, Fukuoka (JP); Yoshihisa Takeyama, Tokyo (JP)

(73) Assignees: KYUSHU UNIVERSITY, NATIONAL UNIVERSITY CORPORATION, Fukuoka (JP); ZEON CORPORATION, Tokyo (JP)

( * ) Notice: Subject to any disclaimer, the term of this patent is extended or adjusted under 35 U.S.C. 154(b) by 509 days.

(21) Appl. No.: 16/494,857

(22) PCT Filed: Mar. 5, 2018

(86) PCT No.: PCT/JP2018/008361
§ 371 (c)(1),
(2) Date: Sep. 17, 2019

(87) PCT Pub. No.: WO2018/180251
PCT Pub. Date: Oct. 4, 2018

(65) Prior Publication Data
US 2020/0041000 A1 Feb. 6, 2020

(30) Foreign Application Priority Data
Mar. 28, 2017 (JP) .................. JP2017-063840

(51) Int. Cl.
*F16J 15/10* (2006.01)
*C08K 3/04* (2006.01)
*C08L 9/02* (2006.01)
*C08L 15/00* (2006.01)
*C08L 15/02* (2006.01)
*C08J 3/22* (2006.01)

(52) U.S. Cl.
CPC .............. *F16J 15/102* (2013.01); *C08J 3/22* (2013.01); *C08K 3/041* (2017.05); *C08L 9/02* (2013.01); *C08L 15/005* (2013.01); *C08L 15/02* (2013.01); *C08K 2201/003* (2013.01); *C08K 2201/011* (2013.01)

(58) Field of Classification Search
CPC ........ F16J 15/102; C08K 3/041; C08L 15/005
See application file for complete search history.

(56) References Cited

U.S. PATENT DOCUMENTS

| 2008/0318049 | A1  | 12/2008 | Hata et al. |
| 2013/0261246 | A1* | 10/2013 | Ong ................ C08K 3/041 524/576 |
| 2014/0154454 | A1  | 6/2014  | Ueki et al. |
| 2018/0362734 | A1  | 12/2018 | Takeyama |

FOREIGN PATENT DOCUMENTS

| EP | 2607407 A1 * | 6/2013  | .............. C08J 3/203 |
| JP | 2014109020 A | 6/2014  | |
| JP | 2015206002 A | 11/2015 | |
| JP | 2016090050 A | 5/2016  | |
| WO | 2006011655 A1 | 2/2006 | |
| WO | 2016208203 A1 | 12/2016 | |

OTHER PUBLICATIONS

Machine translation of EP 2607407 (Jun. 2013, 17 pages).*
Oct. 27, 2020, the Extended European Search Report issued by the European Patent Office in the corresponding European Patent Application No. 18775923.8.
Apr. 3, 2018, International Search Report issued in the International Patent Application No. PCT/JP2018/008361.
Oct. 1, 2019, International Preliminary Report on Patentability issued in the International Patent Application No. PCT/JP2018/008361.

* cited by examiner

*Primary Examiner* — Brieann R Johnston
(74) *Attorney, Agent, or Firm* — Kenja IP Law PC

(57) ABSTRACT

Provided is a composition for a gas seal member that can form a gas seal member for a high-pressure hydrogen device that is capable of sufficiently inhibiting both swelling destruction and blister destruction. The composition for a gas seal member is a composition for a gas seal member used in a high-pressure hydrogen environment and contains an elastomer and fibrous carbon nanostructures. The fibrous carbon nanostructures are contained in a proportion of not less than 1 part by mass and not more than 10 parts by mass per 100 parts by mass of the elastomer. An area fraction S (%) of aggregates of the fibrous carbon nanostructures in a cross-section of the composition for a gas seal member and a volume percentage V (volume %) of the fibrous carbon nanostructures in the composition for a gas seal member satisfy a relationship $0 \leq S/V \leq 2.0$.

7 Claims, 1 Drawing Sheet

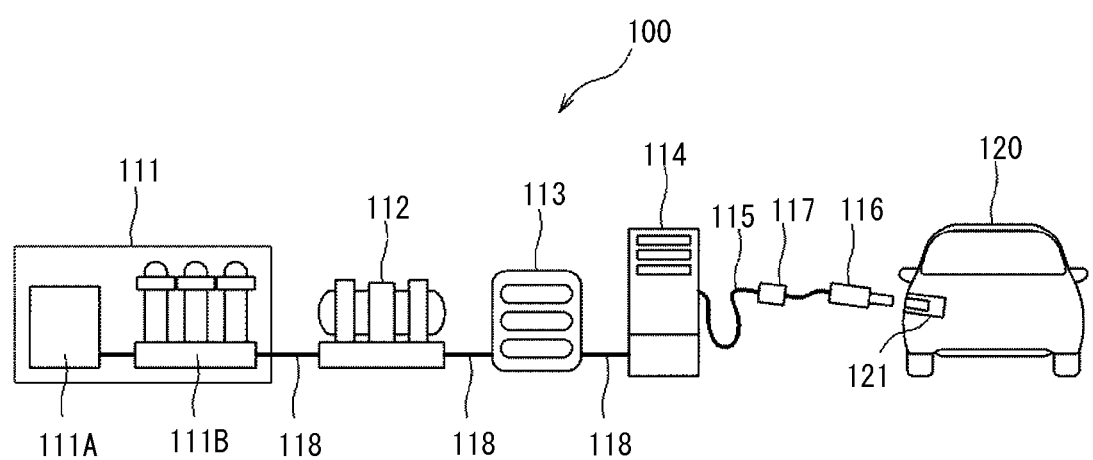

COMPOSITION FOR GAS SEAL MEMBER AND METHOD OF PRODUCING SAME, GAS SEAL MEMBER FOR HIGH-PRESSURE HYDROGEN DEVICE, AND HIGH-PRESSURE HYDROGEN DEVICE

TECHNICAL FIELD

The present disclosure relates to a composition for a gas seal member and a method of producing the same, a gas seal member for a high-pressure hydrogen device, and a high-pressure hydrogen device.

BACKGROUND

Gas seal members such as packings and gaskets have heretofore been used as members for preventing gas leakage. Such gas seal members are used, for example, in hydrogen stations for fuel cell vehicles (for example, refer to Patent Literature (PTL) 1 and 2). Because gas seal members are exposed to harsh conditions such as high-temperature environments in these applications, there is demand for providing gas seal members with higher durability in high-temperature environments.

PTL 3, for example, provides a gas seal member that can endure long-term use even under harsh conditions such as in high-temperature environments. The gas seal member is formed by crosslinking an elastomer composition that is obtained by compounding multi-walled carbon nanotubes having a specific average diameter in a specific proportion relative to a three-component fluoroelastomer.

CITATION LIST

Patent Literature

PTL 1: JP 2016-090050 A
PTL 2: JP 2015-206002 A
PTL 3: JP 2014-109020 A

SUMMARY

Technical Problem

Gas seal members used in high-pressure hydrogen environments in high-pressure hydrogen devices, such as in hydrogen stations for fuel cell vehicles, are required to have durability in hydrogen environments having a high pressure of not lower than 35 MPa and not higher than 105 MPa, for example. Because gas seal members that come into contact with such high-pressure hydrogen may experience swelling destruction and blister destruction, it is necessary to inhibit this destruction.

The term "swelling destruction" as used herein refers to the destruction of a gas seal member that is caused by the gas seal member swelling out from a predetermined installation position (for example, an installation groove) due to contact with high-pressure hydrogen and encroaching into a gap or the like around the installation position. Moreover, the term "blister destruction" as used herein refers to the destruction of a gas seal member that occurs when hydrogen gas that has infiltrated into the gas seal member while in contact with high-pressure hydrogen expands while still present inside the gas seal member upon rapid decompression or the like, causing rupturing of the gas seal member.

Although the gas seal member described in PTL 3 has excellent durability in high-temperature environments, the durability of this gas seal member under high-pressure hydrogen conditions experienced when the gas seal member is adopted in a high-pressure hydrogen device is not sufficient, and thus swelling destruction and blister destruction of the gas seal member cannot be sufficiently inhibited.

Accordingly, an objective of the present disclosure is to provide a composition for a gas seal member that can form a gas seal member for a high-pressure hydrogen device that is capable of sufficiently inhibiting both swelling destruction and blister destruction, and also to provide a method of producing this composition for a gas seal member.

Another objective of the present disclosure is to provide a gas seal member for a high-pressure hydrogen device that can sufficiently inhibit both swelling destruction and blister destruction.

Yet another objective of the present disclosure is to provide a high-pressure hydrogen device in which swelling destruction and blister destruction of a gas seal member are sufficiently inhibited.

Solution to Problem

The inventors conducted diligent investigation to achieve the objectives set forth above. The inventors discovered that both swelling destruction and blister destruction can be sufficiently inhibited by forming a gas seal member for a high-pressure hydrogen device using a composition for a gas seal member that contains fibrous carbon nanostructures in a specific proportion relative to an elastomer, and for which an area fraction S (%) of aggregates of the fibrous carbon nanostructures in a cross-section of the composition for a gas seal member and a volume percentage V (volume %) of the fibrous carbon nanostructures in the composition for a gas seal member satisfy a relationship $0 \leq S/V \leq 2.0$. In this manner, the inventors completed the present disclosure.

Specifically, the present disclosure aims to advantageously solve the problems set forth above by disclosing a composition for a gas seal member used in a high-pressure hydrogen environment, comprising an elastomer and fibrous carbon nanostructures, wherein the fibrous carbon nanostructures are contained in a proportion of not less than 1 part by mass and not more than 10 parts by mass per 100 parts by mass of the elastomer, and an area fraction S, in units of %, of aggregates of the fibrous carbon nanostructures in a cross-section of the composition for a gas seal member and a volume percentage V, in units of volume %, of the fibrous carbon nanostructures in the composition for a gas seal member satisfy a relationship $0 \leq S/V \leq 2.0$. A gas seal member for a high-pressure hydrogen device that can sufficiently inhibit both swelling destruction and blister destruction can be formed when, with regards to a composition for a gas seal member that contains fibrous carbon nanostructures in a specific proportion, the area fraction S (%) of aggregates of the fibrous carbon nanostructures in a cross-section of the composition for a gas seal member and the volume percentage V (volume %) of the fibrous carbon nanostructures in the composition for a gas seal member satisfy the relationship $0 \leq S/V \leq 2.0$ as set forth above.

Note that the composition for a gas seal member is solid material that does not contain a solvent, dispersion medium, or the like.

In the presently disclosed composition for a gas seal member, the elastomer may be nitrile rubber, hydrogenated nitrile rubber, or fluororubber.

Moreover, the fibrous carbon nanostructures preferably have an average diameter of not less than 1 nm and not more than 60 nm. This is because a gas seal member for a high-pressure hydrogen device that is capable of further inhibiting swelling destruction and blister destruction can be formed by using fibrous carbon nanostructures that have an average diameter of not less than 1 nm and not more than 60 nm.

The "average diameter (Av) of fibrous carbon nanostructures" can be determined by measuring the diameters (external diameters) of 100 randomly selected fibrous carbon nanostructures using a transmission electron microscope.

The fibrous carbon nanostructures preferably include single-walled carbon nanotubes. This is because a gas seal member for a high-pressure hydrogen device that is capable of further inhibiting swelling destruction and blister destruction can be formed when the fibrous carbon nanostructures include single-walled carbon nanotubes.

Moreover, the present disclosure aims to advantageously solve the problems set forth above by disclosing a gas seal member for a high-pressure hydrogen device shaped using any one of the compositions for a gas seal member set forth above. A gas seal member for a high-pressure hydrogen device formed using any one of the compositions for a gas seal member set forth above can sufficiently inhibit both swelling destruction and blister destruction.

The presently disclosed gas seal member for a high-pressure hydrogen device set forth above may be used in a state in contact with high-pressure hydrogen having a normal use pressure of not lower than 35 MPa and not higher than 105 MPa.

Moreover, a presently disclosed high-pressure hydrogen device may comprise: a container filled with high-pressure hydrogen having a pressure of not lower than 35 MPa and not higher than 105 MPa; and a gas seal member for a high-pressure hydrogen device in contact with the high-pressure hydrogen in the container. By using the gas seal member for a high-pressure hydrogen device set forth above, sufficient durability can be displayed even in contact with hydrogen having a high pressure of not lower than 35 MPa and not higher than 105 MPa.

The pressure of the high-pressure hydrogen may, for example, be set as 60 MPa or higher or may be set as 70 MPa or higher. Moreover, the pressure of the high-pressure hydrogen may, for example, be set as 100 MPa or lower or may be set as 95 MPa or lower.

Furthermore, the present disclosure aims to advantageously solve the problems set forth above by disclosing a method of producing a composition for a gas seal member by which the presently disclosed composition for a gas seal member is produced, comprising: a slurry preparation step of preparing a slurry containing an elastomer, fibrous carbon nanostructures, and a solvent or dispersion medium; and a removal step of removing the solvent or dispersion medium from the slurry. A gas seal member for a high-pressure hydrogen device that is formed using a composition for a gas seal member produced by the production method set forth above can sufficiently inhibit both swelling destruction and blister destruction.

The method of producing a composition for a gas seal member may further comprise a kneading step including at least one kneading operation of adding and kneading additional elastomer with a mixture of elastomer and fibrous carbon nanostructures after the removal step. The production method set forth above enables cheap and efficient preparation of a mixture (masterbatch) obtained at a stage partway through preparation of the composition for a gas seal member.

In the presently disclosed method of producing a composition for a gas seal member, the kneading step preferably includes at least one kneading operation in which mass (A) of a mixture prior to elastomer addition and mass (B) of elastomer added to the mixture satisfy a relationship $0.45 \leq A/(A+B) < 1$. This is because through inclusion of at least one kneading operation satisfying the relationship $0.45 \leq A/(A+B) < 1$, fibrous carbon nanostructures can be favorably dispersed, and a composition for a gas seal member that can form a gas seal member for a high-pressure hydrogen device that is capable of further inhibiting swelling destruction and blister destruction can be favorably formed at low cost.

Advantageous Effect

According to the present disclosure, it is possible to provide a composition for a gas seal member that can form a gas seal member for a high-pressure hydrogen device that is capable of sufficiently inhibiting both swelling destruction and blister destruction, and also to provide a method of producing this composition for a gas seal member.

Moreover, according to the present disclosure, it is possible to provide a gas seal member for a high-pressure hydrogen device that can sufficiently inhibit both swelling destruction and blister destruction.

Furthermore, according to the present disclosure, it is possible to provide a high-pressure hydrogen device in which swelling destruction and blister destruction of a gas seal member are sufficiently inhibited.

BRIEF DESCRIPTION OF THE DRAWING

In the accompanying drawing,
FIG. 1 is a schematic view illustrating configuration of a hydrogen station.

DETAILED DESCRIPTION

The following provides a detailed description of embodiments of the present disclosure.

A composition for a gas seal member according to the present disclosure is used to form a gas seal member such as a packing or a gasket. Moreover, a gas seal member for a high-pressure hydrogen device according to the present disclosure can be shaped using the composition for a gas seal member according to the present disclosure and can be used, for example, as a member for preventing gas leakage in a hydrogen station for fuel cell vehicles or the like. In particular, the gas seal member for a high-pressure hydrogen device according to the present disclosure can suitably be used in a high-pressure hydrogen device where the gas seal member for a high-pressure hydrogen device comes into contact with high-pressure hydrogen. One example of such a high-pressure hydrogen device includes a container filled with high-pressure hydrogen and a gas seal member for a high-pressure hydrogen device that is in contact with the high-pressure hydrogen in the container and prevents leakage of the high-pressure hydrogen. The term "high-pressure hydrogen device" as used herein refers to a device that handles hydrogen having a high pressure (for example, not lower than 35 MPa and not higher than 105 MPa). Specific examples include devices used in hydrogen stations such as a hydrogen generator (for example, a hydrogen generator 111 in FIG. 1 described further below), a hydrogen gas compressor (for example, a hydrogen gas compressor (pressurizing device) 112 in FIG. 1 described further below), a gas accumulator (for example, a gas accumulator (pressure accumulator) 113 in FIG. 1 described further below), a dispenser (for example, a dispenser 114 in FIG. 1 described further below), and a fuel cell mounted in a vehicle (for example, a vehicle (fuel cell vehicle) 120 in FIG. 1 described further below).

(Composition for Gas Seal Member)

The presently disclosed composition for a gas seal member contains an elastomer and fibrous carbon nanostructures, and may optionally further contain additives such as a reinforcing material, a crosslinking agent, and an antioxidant. In the presently disclosed composition for a gas seal member, an area fraction S (%) of aggregates of the fibrous carbon nanostructures in a cross-section of the composition for a gas seal member and a volume percentage V (volume %) of the fibrous carbon nanostructures in the composition for a gas seal member, which are measured by methods described further below, satisfy a relationship $0 \leq S/V \leq 2.0$.

The content of the fibrous carbon nanostructures in the composition for a gas seal member is 1 part by mass or more per 100 parts by mass of the elastomer.

The ratio (S/V) of the area fraction S (%) of aggregates of the fibrous carbon nanostructures in a cross-section of the composition for a gas seal member relative to the volume percentage V (volume %) of the fibrous carbon nanostructures in the composition for a gas seal member is preferably 1.5 or less, more preferably 1.0 or less, even more preferably 0.8 or less, further preferably 0.5 or less, particularly preferably 0.34 or less, and most preferably 0.11 or less.

When S/V is not less than 0 and not more than 0.5, both swelling destruction and blister destruction can be further inhibited.

<Area Fraction S (%)>

The area fraction S (%) of aggregates of the fibrous carbon nanostructures can be determined by, for example, observing a cross-section of a prepared composition for a gas seal member under side illumination using a digital microscope with a 3 mm×2 mm field of view (×100 magnification), acquiring an image of the cross-section, performing binarization of the acquired image using image processing software, measuring the area of aggregates of the fibrous carbon nanostructures in the image to determine the total area (Sc) of aggregates of the fibrous carbon nanostructures in a 3 mm×2 mm range, and then dividing this value by the observation field area (St).

$$S=(Sc/St) \times 100 (\%)$$

Note that an aggregate of fibrous carbon nanostructures is matter resulting from a plurality of (two or more) fibrous carbon nanostructures coming into contact and aggregating.

<Volume Percentage V (Volume %)>

The volume percentage V (volume %) of the fibrous carbon nanostructures in the composition for a gas seal member can be determined by, for example, using a thermogravimetric analyzer to heat a prepared composition for a gas seal member under a nitrogen atmosphere in a temperature range of room temperature to 700° C. with a heating rate of 20° C./min and then hold the composition at 700° C. for 5 minutes to cause thermal decomposition of resin (elastomer), calculating the weight (WP) of resin (elastomer) in the composition for a gas seal member, subsequently switching the nitrogen atmosphere to an air atmosphere, holding the composition at 700° C. under the air atmosphere for 10 minutes to cause decomposition of fibrous carbon nanostructures and thereby calculate the weight (WC) of the fibrous carbon nanostructures in the composition for a gas seal member, and then determining the volume percentage V (volume %) of the fibrous carbon nanostructures in the composition for a gas seal member from the specific gravity $\rho P$ of the resin (elastomer) and the specific gravity $\rho C$ of the fibrous carbon nanostructures using the following equation.

$$V=(WC/\rho C)/\{(WP/\rho P)+(WC/\rho C)\} \times 100 (\text{volume }\%)$$

The area fraction S (%) of aggregates of the fibrous carbon nanostructures can be adjusted by, for example, altering the mixing conditions of the elastomer and the fibrous carbon nanostructures or altering the type, properties, and amount of the fibrous carbon nanostructures. Specifically, adopting mixing conditions that facilitate aggregation of the fibrous carbon nanostructures or using fibrous carbon nanostructures that readily aggregate increases the area fraction S (%).

<Elastomer>

The elastomer in the composition for a gas seal member is not specifically limited and may be any known elastomer that is used in formation of a gas seal member. Specific examples of the elastomer include natural rubber, butadiene rubber, styrene butadiene rubber, isoprene rubber, nitrile rubber (NBR), hydrogenated nitrile rubber (H-NBR), fluororubber, chloroprene rubber, ethylene propylene rubber, halogenated butyl rubber, polyisobutylene rubber, silicone rubber, and ethylene-propylene-diene rubber (EPDM). One of these elastomers may be used individually, or two or more of these elastomers may be used in combination.

Of these elastomers, rubbers having a Mooney viscosity ($ML_{1+4}$, 100° C.) of not less than 20 and not more than 150 (for example, hydrogenated nitrile rubber and nitrile rubber) and fluororubbers having a Mooney viscosity ($ML_{1+10}$, 121° C.) of not less than 20 and not more than 150 are preferable as the elastomer. The Mooney viscosities referred to in the present disclosure can be measured in accordance with JIS K6300.

Note that fluororubber (for example, FKM) is preferable as an elastomer contained in a gas seal member used in a hydrogen gas compressor (pressurizing device) (for example, −20° C. to 180° C.; 95 MPa), nitrile rubber (NBR) and hydrogenated nitrile rubber (H-NBR) are preferable as an elastomer contained in a gas seal member used in a gas accumulator (pressure accumulator) (for example, −20° C. to 50° C.; 95 MPa), and ethylene-propylene-diene rubber (EPDM) is preferable as an elastomer contained in a gas seal member used in a dispenser (for example, −40° C. to 50° C.; 82 MPa).

<Fibrous Carbon Nanostructures>

The fibrous carbon nanostructures may, for example, be cylindrical carbon nanostructures such as carbon nanotubes (CNTs), non-cylindrical carbon nanostructures such as carbon nanostructures composed of a network of 6-membered carbon rings formed in a flattened cylindrical shape, or cellulose nanofibers.

Inclusion of fibrous carbon nanostructures in an elastomer composition can inhibit swelling destruction and blister destruction.

Although it is not clear why swelling destruction and blister destruction can be inhibited through inclusion of fibrous carbon nanostructures in the composition for a gas seal member, the reason is presumed to be as follows. Fibrous carbon nanostructures can provide a high reinforcing effect compared to carbon black and the like even when added in a small amount. Moreover, hydrogen does not easily dissolve inside fibrous carbon nanostructures compared to carbon black and the like. This is presumed to inhibit blister destruction of a gas seal member in which fibrous carbon nanostructures are used because hydrogen that has infiltrated into the gas seal member can easily escape from the gas seal member upon rapid decompression or the like. It is also presumed that because fibrous carbon nanostructures have a higher reinforcing effect than carbon black or the like, a gas seal member in which fibrous carbon nanostructures are used is less likely to deform even upon coming into contact with high-pressure hydrogen (i.e., displays a low volume swelling ratio), and is, therefore, less likely to experience swelling destruction.

The content of the fibrous carbon nanostructures per 100 parts by mass of the elastomer in the composition for a gas seal member is required to be 1 part by mass or more, and is preferably 2 parts by mass or more, more preferably 3 parts by mass or more, even more preferably 5 parts by mass or more, particularly preferably 7 parts by mass or more, and most preferably 8 parts by mass or more. If the content of the fibrous carbon nanostructures is less than 1 part by mass per 100 parts by mass of the elastomer, strength of a gas seal member shaped using the composition for a gas seal member cannot be ensured, and swelling destruction and blister destruction of the gas seal member cannot be sufficiently inhibited.

Moreover, the content of the fibrous carbon nanostructures per 100 parts by mass of the elastomer in the composition for a gas seal member is required to be 10 parts by mass or less, and is preferably 9.5 parts by mass or less, and more preferably 9 parts by mass or less. If the content of the fibrous carbon nanostructures is more than 10 parts by mass per 100 parts by mass of the elastomer, blister destruction of a gas seal member shaped using the composition for a gas seal member cannot be sufficiently inhibited because hydrogen that has infiltrated into the gas seal member cannot easily escape upon rapid decompression or the like, and strength of a gas seal member shaped using the composition for a gas seal member decreases because of an increase in aggregates of the fibrous carbon nanostructures.

The fibrous carbon nanostructures are not specifically limited and, for example, may be composed of only single-walled carbon nanotubes (single-walled CNTs), may be composed of only multi-walled carbon nanotubes (multi-walled CNTs), may be a mixture of single-walled CNTs and multi-walled CNTs, or may be a mixture of carbon nanotubes (CNTs) and fibrous carbon nanostructures other than CNTs.

Single-walled CNTs are preferable in terms that, compared to multi-walled CNTs, hydrogen is even less readily adsorbed thereby and the reinforcing effect thereof is greater.

From a viewpoint of further inhibiting both swelling destruction and blister destruction of a gas seal member shaped using the elastomer composition, the proportion constituted by single-walled CNTs among 100 fibrous carbon nanostructures is preferably 50 or more, more preferably 70 or more, even more preferably 90 or more, and particularly preferably 100.

It is preferable that fibrous carbon nanostructures including single-walled CNTs are used as the fibrous carbon nanostructures contained in the presently disclosed composition for a gas seal member. This is because swelling destruction and blister destruction can be further inhibited by using fibrous carbon nanostructures that include single-walled CNTs.

Although it is not clear why swelling destruction and blister destruction can be further inhibited by using fibrous carbon nanostructures that include single-walled CNTs, the reason is presumed to be as follows. Hydrogen easily permeates single-walled CNTs compared to multi-walled CNTs. This is presumed to further inhibit blister destruction of a gas seal member in which single-walled CNTs are used because hydrogen that has infiltrated into the gas seal member can easily escape from the gas seal member upon rapid decompression or the like. Moreover, it is presumed that as a result of single-walled CNTs having a greater reinforcing effect than multi-walled CNTs, a gas seal member in which single-walled CNTs are used is less likely to deform even upon coming into contact with high-pressure hydrogen, and thus swelling destruction can be further inhibited.

In a case in which fibrous carbon nanostructures including single-walled CNTs are used, the content of the fibrous carbon nanostructures including single-walled CNTs per 100 parts by mass of the elastomer in the composition for a gas seal member is preferably 3 parts by mass or more, more preferably 5 parts by mass or more, even more preferably 7 parts by mass or more, and particularly preferably 8 parts by mass or more. If the content of the fibrous carbon nanostructures including single-walled CNTs is less than 3 parts by mass per 100 parts by mass of the elastomer, it may not be possible to ensure strength of a gas seal member shaped using the elastomer composition, and it may not be possible to sufficiently inhibit swelling destruction and blister destruction.

Moreover, the content of the fibrous carbon nanostructures including single-walled CNTs per 100 parts by mass of the elastomer in the elastomer composition used for forming a gas seal member for a high-pressure hydrogen device is preferably 9.5 parts by mass or less, more preferably 9 parts by mass or less, and even more preferably 8.5 parts by mass or less. If the content of the fibrous carbon nanostructures including single-walled CNTs is more than 9.5 parts by mass per 100 parts by mass of the elastomer, it may not be possible to sufficiently inhibit blister destruction of a gas seal member shaped using the elastomer composition because hydrogen that has infiltrated into the gas seal member cannot easily escape from the gas seal member upon rapid decompression or the like, and strength of a gas seal member shaped using the composition for a gas seal member may decrease because of an increase in aggregates of the fibrous carbon nanostructures.

The fibrous carbon nanostructures preferably exhibit a convex upward shape in a t-plot obtained from an adsorption isotherm. By using fibrous carbon nanostructures exhibiting a convex upward shape in t-plot obtained from an adsorption isotherm, a gas seal member that is capable of further inhibiting blister destruction can be formed.

It is more preferable that the fibrous carbon nanostructures have not undergone CNT opening treatment and exhibit a convex upward shape in a t-plot.

In general, adsorption is a phenomenon in which gas molecules are taken onto a solid surface from the gas phase and is categorized as physical adsorption or chemical adsorption depending on the main cause of adsorption. The nitrogen gas adsorption method used for obtaining the t-plot utilizes physical adsorption. In general, when the adsorption temperature is kept constant, the number of nitrogen gas molecules that are adsorbed by a fibrous carbon nanostructure increases with increasing pressure. A plot of the relative pressure (ratio of pressure at adsorption equilibrium P and saturated vapor pressure P0) on a horizontal axis and the amount of adsorbed nitrogen gas on a vertical axis is referred to as an "isotherm". The isotherm is referred to as an "adsorption isotherm" in a situation in which the amount of adsorbed nitrogen gas is measured while increasing the pressure and is referred to as a "desorption isotherm" in a situation in which the amount of adsorbed nitrogen gas is measured while decreasing the pressure.

The t-plot is obtained from the adsorption isotherm measured by the nitrogen gas adsorption method by converting the relative pressure to an average thickness t (nm) of an adsorbed layer of nitrogen gas. Specifically, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

In a sample having pores at its surface, the growth of the adsorbed layer of nitrogen gas is categorized into the following processes (1) to (3). The gradient of the t-plot changes in accordance with processes (1) to (3).

(1) A process in which a single molecule adsorption layer of nitrogen molecules is formed over the entire surface (2) A process in which a multi-molecule adsorption layer is formed and is accompanied by capillary condensation filling of pores (3) A process in which a multi-molecule adsorption layer is formed at a surface that appears to be non-porous due to the pores being filled by nitrogen It is preferable that the t-plot for the fibrous carbon nanostructures is on a straight line passing through the origin in a region in which the average adsorbed nitrogen gas layer thickness t is small and deviates downward from the straight line as t increases to have a convex upward shape. Such a t-plot shape indicates that the ratio of internal specific surface area to total specific surface area of the fibrous carbon nanostructures is large and that a large number of openings are formed in the carbon nanostructures that constitute the fibrous carbon nanostructures. It is presumed that as a result of a large number of openings being formed, gas that has infiltrated into the fibrous carbon nanostructures can easily permeate and escape from the fibrous carbon nanostructures (i.e., blister destruction of a gas seal member containing the fibrous carbon nanostructures is unlikely to occur).

It is preferable that the t-plot for the fibrous carbon nanostructures has a bending point within a range of $0.2 \leq t$ (nm)$\leq 1.5$, more preferably within a range of $0.45 \leq t$ (nm) $\leq 1.5$, and even more preferably within a range of $0.55 \leq t$ (nm)$\leq 1.0$. When the position of the bending point of the t-plot is within any of the ranges set forth above, blister destruction can be further inhibited because characteristics of the fibrous carbon nanostructures are further enhanced.

The "position of the bending point" is an intersection point of a linear approximation A for process (1) and a linear approximation B for process (3) in the t-plot.

A ratio (S2/S1) of internal specific surface area S2 relative to total specific surface area S1 of the fibrous carbon nanostructures obtained from the t-plot is preferably 0.05 or more, more preferably 0.06 or more, and even more preferably 0.08 or more, and is preferably 0.30 or less. When S2/S1 is not less than 0.05 and not more than 0.30, blister destruction can be further inhibited because characteristics of the fibrous carbon nanostructures can be further enhanced.

Although no specific limitations are placed on the total specific surface area S1 and the internal specific surface area S2 of the fibrous carbon nanostructures, individually, S1 is preferably not less than 600 m$^2$/g and not more than 1,400 m$^2$/g, and more preferably not less than 800 m$^2$/g and not more than 1,200 m$^2$/g, whereas S2 is preferably not less than 30 m$^2$/g and not more than 540 m$^2$/g.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm for fibrous carbon nanostructures, preparation of a t-plot, and calculation of total specific surface area S1 and internal specific surface area S2 based on t-plot analysis can be made using a BELSORP®-mini (BELSORP is a registered trademark in Japan, other countries, or both), for example, which is a commercially available measurement instrument produced by Bel Japan Inc.

The fibrous carbon nanostructures are preferably fibrous carbon nanostructures for which a ratio 3σ/Av of a value 3σ obtained by multiplying the diameter standard deviation (σ) by 3 relative to the average diameter (Av) is more than 0.20 and less than 0.60, more preferably fibrous carbon nanostructures for which 3σ/Av is more than 0.25, and even more preferably fibrous carbon nanostructures for which 3σ/Av is more than 0.40. When fibrous carbon nanostructures for which 3σ/Av is more than 0.20 and less than 0.60 are used, a gas seal member that is capable of further inhibiting swelling destruction and blister destruction can be formed.

Herein, the "average diameter (Av) of the fibrous carbon nanostructures" and the "diameter standard deviation (σ: sample standard deviation) of the fibrous carbon nanostructures" can each be obtained by measuring the diameters (external diameters) of 100 randomly selected fibrous carbon nanostructures using a transmission electron microscope. The average diameter (Av) and standard deviation (σ) of the fibrous carbon nanostructures may be adjusted by altering the production method or production conditions of the fibrous carbon nanostructures, or by combining a plurality of types of fibrous carbon nanostructures obtained by different production methods.

The average diameter (Av) of the fibrous carbon nanostructures is preferably 2 nm or more, and more preferably 2.5 nm or more, and is preferably 60 nm or less, and more preferably 10 nm or less. When the average diameter (Av) of the fibrous carbon nanostructures is 2 nm or more, the fibrous carbon nanostructures are well dispersed within a crosslinked product without aggregating, resulting in a sufficient reinforcing effect. When the average diameter (Av) of the fibrous carbon nanostructures is 60 nm or less, passage of hydrogen through a crosslinked product is not inhibited, and reduction of the hydrogen diffusion coefficient can be prevented.

The fibrous carbon nanostructures preferably have an average structure length at the time of synthesis of 100 μm or more. Fibrous carbon nanostructures that have a longer structure length at the time of synthesis tend to be more easily damaged by breaking, severing, or the like during dispersion. Therefore, it is preferable that the average structure length at the time of synthesis is 5,000 μm or less.

The aspect ratio (length/diameter) of the fibrous carbon nanostructures is preferably more than 10. The aspect ratio of the fibrous carbon nanostructures can be determined by measuring the diameters and lengths of 100 randomly selected fibrous carbon nanostructures using a transmission electron microscope, and then calculating an average value of the ratio of diameter and length (length/diameter).

The BET specific surface area of the fibrous carbon nanostructures is preferably 600 $m^2/g$ or more, and more preferably 800 $m^2/g$ or more, and is preferably 2,500 $m^2/g$ or less, and more preferably 1,200 $m^2/g$ or less. When the BET specific surface area of the fibrous carbon nanostructures is 600 $m^2/g$ or more, swelling destruction of a gas seal member shaped using the elastomer composition can be further inhibited because the strength of the gas seal member can be increased. Moreover, when the BET specific surface area of the fibrous carbon nanostructures is 2,500 $m^2/g$ or less, it is possible to reduce the amount of gas that infiltrates into the fibrous carbon nanostructures from the surface thereof and form a gas seal member that is capable of further inhibiting blister destruction. In addition, the fibrous carbon nanostructures can be well dispersed within a crosslinked product without aggregating, resulting in a sufficient reinforcing effect.

Herein, the term "BET specific surface area" refers to nitrogen adsorption specific surface area measured by the BET method.

In the subsequently described super growth method, the fibrous carbon nanostructures are obtained on a substrate having a catalyst layer for carbon nanotube growth at the surface and are obtained in the form of an assembly aligned substantially perpendicularly to the substrate (aligned assembly). The mass density of the fibrous carbon nanostructures in the form of such an assembly is preferably not less than 0.002 $g/cm^3$ and not more than 0.2 $g/cm^3$. A mass density of 0.2 $g/cm^3$ or less allows the fibrous carbon nanostructures to be homogeneously dispersed within the elastomer because binding among the fibrous carbon nanostructures is weakened. A mass density of 0.002 $g/cm^3$ or more improves the unity of the fibrous carbon nanostructures, thus preventing the fibrous carbon nanostructures from becoming unbound and making the fibrous carbon nanostructures easier to handle.

Fibrous carbon nanostructures having the properties set forth above can be efficiently produced by, for example, in a method in which during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve catalytic activity of the catalyst layer (super growth method; refer to WO 2006/011655 A1), forming the catalyst layer on the substrate surface by a wet process. Hereinafter, carbon nanotubes that are obtained by the super growth method are also referred to as "SGCNTs".

The fibrous carbon nanostructures produced by the super growth method may be composed of SGCNTs only, or may be composed of SGCNTs and non-cylindrical carbon nanostructures. Specifically, the fibrous carbon nanostructures may include single- or multi-walled flattened-tube carbon nanostructures having a tape-like portion where inner walls are in close proximity to each other or bonded together along the entire length thereof (hereinafter, such carbon nanostructures are also referred to as "graphene nanotapes (GNTs)").

<Additives>

Examples of additives that may optionally be compounded in the composition for a gas seal member include, but are not specifically limited to, known additives such as a reinforcing material, a crosslinking agent, a crosslinking aid, and an antioxidant.

Specific examples of reinforcing materials that may be used include, but are not specifically limited to, carbon black and silica.

The crosslinking agent is not specifically limited and may be a known crosslinking agent that is capable of crosslinking the elastomer contained in the elastomer composition. Specific examples of crosslinking agents that may be used include sulfur, peroxide-based crosslinking agents (for example, 1,3-bis(t-butylperoxyisopropyl)benzene), and triallyl isocyanurate.

The crosslinking aid may be zinc oxide or the like, for example, but is not specifically limited thereto.

Examples of antioxidants that may be used include, but are not specifically limited to, amine-based antioxidants (for example, 4,4'-bis(a,a-dimethylbenzyl)diphenylamine) and imidazole-based antioxidants (for example, zinc salt of 2-mercaptobenzimidazole).

One of these additives may be used individually, or two or more of these additives may be used in combination. The amount of an additive that is used may be any amount that does not impair expression of the desired effects.

<Preparation of Composition for Gas Seal Member>

The composition for a gas seal member can be prepared by, for example, mixing or kneading the elastomer, the fibrous carbon nanostructures, and the optionally used additives in desired ratio.

Specifically, the composition for a gas seal member can be prepared by obtaining a mixture of the elastomer and the fibrous carbon nanostructures (masterbatch) and subsequently kneading the optional additives with the obtained mixture (masterbatch), but is not specifically limited to being prepared in this manner.

The mixture of the elastomer and the fibrous carbon nanostructures (masterbatch) can be prepared by any mixing method that enables dispersion of the fibrous carbon nanostructures in the elastomer. Specific examples of methods by which the mixture (masterbatch) may be prepared include, but are not specifically limited to, (i) a method in which fibrous carbon nanostructures are added to an elastomer solution obtained by dissolving an elastomer in an organic solvent or to an elastomer dispersion liquid obtained by dispersing the elastomer in a dispersion medium, and are subjected to dispersing treatment using a homogenizer, a wet jet mill, or the like to prepare a slurry (slurry preparation step), and the organic solvent or the dispersion medium is subsequently removed from the dispersion-treated liquid (i.e., the obtained slurry) (removal step); and (ii) a method in which fibrous carbon nanostructures are added to an elastomer solution obtained by dissolving an elastomer in an organic solvent or to an elastomer dispersion liquid obtained by dispersing the elastomer in a dispersion medium, and are subjected to dispersing treatment using a homogenizer, a wet jet mill, or the like to prepare a slurry (slurry preparation step), the organic solvent or the dispersion medium is subsequently removed from the dispersion-treated liquid (i.e., the obtained slurry) (removal step), and then at least one kneading operation of adding and kneading additional elastomer with the mixture of elastomer and fibrous carbon nanostructures is performed (kneading step). Removal of the solvent or dispersion medium can be effected by coagulation, casting, or drying, for example.

In other words, the method by which the mixture of the elastomer and the fibrous carbon nanostructures (masterbatch) is obtained may be (i) a method in which all of the elastomer and the fibrous carbon nanostructures contained in the finally obtained composition for a gas seal member are mixed at once and then the organic solvent or dispersion medium is removed; or (ii) a method in which the fibrous carbon nanostructures and a portion of the elastomer contained in the finally obtained composition for a gas seal member are mixed, the organic solvent or dispersion medium is removed, and then at least one kneading operation of adding and kneading additional elastomer with the resultant mixture is performed.

Method (i) is preferable from a viewpoint of allowing particularly good dispersion of the fibrous carbon nanostructures. On the other hand, method (ii) is preferable from a viewpoint that the amount of organic solvent or dispersion medium that is used and the energy required for removal thereof can be reduced, and the cost of dispersing treatment can be reduced, which enables low cost acquisition of the masterbatch.

The number of times that a kneading operation of adding and kneading additional elastomer with a mixture of elastomer and fibrous carbon nanostructures is performed is preferably 1 or more times, and more preferably 2 or more times from a viewpoint of uniformly mixing the fibrous carbon nanostructures, and is preferably 7 or fewer times, and more preferably 5 or fewer times from a viewpoint of preventing reduction of performance due to severing of elastomer molecule chains or destruction of fibrous carbon nanostructures.

In a case in which at least one kneading operation of adding and kneading additional elastomer with a mixture of elastomer and fibrous carbon nanostructures is performed, it is preferable that at least one kneading operation is included in which mass (A) of a mixture prior to elastomer addition (in a case in which elastomer has already been added in a kneading operation preceding that kneading operation, the mixture after addition of this elastomer) and mass (B) of elastomer added to the mixture satisfy a relationship $0.45 \leq A/(A+B) < 1$. In a case in which a plurality of kneading operations are performed, it is preferable that at least one of the kneading operations satisfies this relationship, and more preferable that all of the kneading operations satisfy this relationship. By performing a kneading operation that satisfies the relationship $0.45 \leq A/(A+B) < 1$, the S/V value of the obtained composition can be reduced, and dispersibility of the fibrous carbon nanostructures can be improved.

Moreover, $A/(A+B)$ is preferably 0.5 or more, more preferably 0.6 or more, and particularly preferably 0.62 or more from a viewpoint of performance of a gas seal member for a high-pressure hydrogen device in which the obtained composition for a gas seal member is used, and is preferably 0.9 or less, more preferably 0.8 or less, and particularly preferably 0.72 or less from a viewpoint of cost.

Kneading can be carried out using a mixer, a single screw kneader, a twin screw kneader, a roll, a Brabender, an extruder, or the like.

Although no specific limitations are placed on the shaping/crosslinking conditions, shaping and crosslinking are preferably carried out under conditions of a temperature of 140° C. to 250° C. (preferably 150° C. to 170° C.), a pressure of 1 MPa to 20 MPa (preferably 8 MPa to 12 MPa), and a time of 1 minute to 180 minutes (preferably 5 minutes to 15 minutes).

(Gas Seal Member for High-Pressure Hydrogen Device)

The presently disclosed gas seal member for a high-pressure hydrogen device can be obtained by shaping the composition for a gas seal member set forth above into a desired shape. Specifically, the gas seal member for a high-pressure hydrogen device can be formed by, for example, loading the composition for a gas seal member into a mold, and then optionally performing crosslinking. The gas seal member for a high-pressure hydrogen device shaped using the composition for a gas seal member contains components derived from components that were contained in the composition for a gas seal member in the same ratio as in the composition for a gas seal member. In other words, in a case in which the composition for a gas seal member contained a crosslinking agent, for example, the gas seal member for a high-pressure hydrogen device contains a crosslinked elastomer and fibrous carbon nanostructures in a specific ratio, and may optionally further contain additives such as an antioxidant.

The gas seal member for a high-pressure hydrogen device may be formed into any shape depending on the application. For example, the gas seal member for a high-pressure hydrogen device may be an annular gas seal member (O-ring) or a hollow disk-shaped gas seal member.

The gas seal member for a high-pressure hydrogen device described above can sufficiently inhibit both swelling destruction and blister destruction.

In a case in which the gas seal member for a high-pressure hydrogen device contains a crosslinked product obtained through crosslinking of the elastomer composition described further below, the "tensile strength" and "elongation at break" of the crosslinked product can be measured in accordance with JIS K6251.

Moreover, the "dissolved hydrogen amount" of the crosslinked product can be measured by measuring the amount of hydrogen released from a specimen after high-pressure hydrogen exposure using a temperature-programmed desorption gas analyzer and calculating a saturated hydrogen amount (measuring change in the amount of hydrogen released by the post-hydrogen exposure specimen over time).

The "degree of volume swelling" of the crosslinked product can be measured by using a two-dimensional multipoint size meter to measure the area of a two-dimensional silhouette image of a specimen after high-pressure hydrogen exposure and calculating the volume (i.e., based on the proportion of change in volume between before and after hydrogen exposure).

(High-Pressure Hydrogen Device)

The presently disclosed high-pressure hydrogen device includes a container filled with high-pressure hydrogen and the presently disclosed gas seal member for a high-pressure hydrogen device. The gas seal member for a high-pressure hydrogen device is in contact with the high-pressure hydrogen in the container.

Examples of such high-pressure hydrogen devices include devices used in hydrogen stations such as a hydrogen generator (for example, a hydrogen generator 111 in FIG. 1 described further below), a hydrogen gas compressor (for example, a hydrogen gas compressor (pressurizing device) 112 in FIG. 1 described further below), a gas accumulator (for example, a gas accumulator (pressure accumulator) 113 in FIG. 1 described further below), a dispenser (for example, a dispenser 114 in FIG. 1 described further below), and a fuel cell mounted in a vehicle (for example, a vehicle (fuel cell vehicle) 120 in FIG. 1 described further below).

FIG. 1 is a schematic view illustrating configuration of a hydrogen station.

In FIG. 1, a hydrogen station 100 includes a hydrogen generator 111, a hydrogen gas compressor (pressurizing device) 112, a gas accumulator (pressure accumulator) 113, and a dispenser 114. These pieces of equipment are connected by hydrogen pipes 118. Moreover, pipe devices (not illustrated) such as valves and joints may be disposed partway along these hydrogen pipes 118 as necessary.

At an on-site type hydrogen station 100, fuel (naphtha or kerosene) is supplied from outside of the hydrogen station 100 and this fuel is used to produce hydrogen in the hydrogen generator 111, which includes a fuel reformer 111A and a hydrogen purifier 111B for increasing hydrogen purity.

The hydrogen produced by the hydrogen generator 111 is converted to high-pressure hydrogen having a specific temperature (for example, −20° C. to 180° C.) and pressure (for example, 95 MPa) by the hydrogen gas compressor (pressurizing device) 112. The pressurized hydrogen is supplied to a vehicle (fuel cell vehicle) 120 including a hydrogen tank (not illustrated) via the gas accumulator (pressure accumulator) 113, which is for temporary storage of the high-pressure hydrogen, and via the dispenser 114, which is for supplying the high-pressure hydrogen stored in the gas accumulator (pressure accumulator) 113 to the vehicle (fuel cell vehicle) 120.

During the above, supply of hydrogen from the dispenser 114 to the vehicle (fuel cell vehicle) 120 is achieved through hydrogen pressure difference. For example, the temperature and pressure in the gas accumulator (pressure accumulator) 113 are set to −20° C. to 50° C. and 95 MPa, respectively, and the temperature and pressure at the dispenser 114 are set to −40° C. to 50° C. and 82 MPa, respectively, whereby hydrogen fills the hydrogen tank in the vehicle (fuel cell vehicle) 120 by the pressure difference.

The dispenser 114 includes a hydrogen supply hose 115 for supplying hydrogen to the hydrogen tank of the vehicle (fuel cell vehicle) 120. A hydrogen supply plug 116 for detachable connection to a receptacle 121 of the vehicle 120 is attached to the hydrogen supply hose 115. Thus, by connecting the hydrogen supply plug 116 to the receptacle 121, hydrogen can be supplied to the vehicle (fuel cell vehicle) 120.

An emergency release coupling 117 is disposed partway along the hydrogen supply hose 115. Thus, in an emergency (for example, when the vehicle (fuel cell vehicle) 120 has erroneously started moving), the emergency release coupling 117 is operated to stop the supply of hydrogen from the hydrogen station 100 side to the vehicle (fuel cell vehicle) 120 side.

The presently disclosed gas seal member for a high-pressure hydrogen device is, for example, disposed at a connecting part for each piece of equipment (hydrogen generator 111, hydrogen gas compressor (pressurizing device) 112, gas accumulator (pressure accumulator) 113, and dispenser 114) with a hydrogen pipe 118, or between a container body and a lid in each piece of equipment (hydrogen generator 111, hydrogen gas compressor (pressurizing device) 112, gas accumulator (pressure accumulator) 113, and dispenser 114).

The same applies to an off-site type station where hydrogen that has been produced outside of the station is transported to the station and is supplied to the hydrogen gas compressor (pressurizing device) 112.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure or evaluate the area fraction S (%) of aggregates of fibrous carbon nanostructures in a cross-section of a composition for a gas seal member, the volume percentage V (volume %) of fibrous carbon nanostructures in a composition for a gas seal member, and the tensile strength, dissolved hydrogen amount, and degree of volume swelling of a crosslinked product.

<Area Fraction S (%)>

A cross-section of a prepared composition for a gas seal member was observed under side illumination using a digital microscope (produced by Keyence Corporation; product name: VHX-900) with a 3 mm×2 mm field of view (×100 magnification), and an image of the cross-section was acquired. Image processing software (produced by Mitani Corporation; product name: WinROOF 2015) was used to perform binarization of the acquired image and subsequently measure the area of aggregates of fibrous carbon nanostructures in the image to determine the total area (Sc) of fibrous carbon nanostructure aggregates in a 3 mm×2 mm range. The determined value was divided by the observation field area (St) to determine an area fraction S (%) of the fibrous carbon nanostructure aggregates.

$$S = (Sc/St) \times 100 (\%)$$

<Volume Percentage V (Volume %)>

A thermogravimetric analyzer (produced by TA Instruments; product name: Discovery TGA) was used to heat a prepared composition for a gas seal member under a nitrogen atmosphere in a temperature range of room temperature to 700° C. with a heating rate of 20° C./min and then hold the composition at 700° C. for 5 minutes to cause thermal decomposition of resin (elastomer). The weight (WP) of resin (elastomer) in the composition for a gas seal member was calculated. Next, the nitrogen atmosphere was switched to an air atmosphere and the composition for a gas seal member was held at 700° C. under the air atmosphere for 10 minutes to cause decomposition of fibrous carbon nanostructures, and thereby calculate the weight (WC) of fibrous carbon nanostructures in the composition for a gas seal member. The volume percentage V (volume %) of the fibrous carbon nanostructures in the composition for a gas seal member was calculated from the specific gravity ρP of the resin (elastomer) and the specific gravity ρC of the fibrous carbon nanostructures using the following equation.

$$V = (WC/\rho C) / \{(WP/\rho P) + (WC/\rho C)\} \times 100 (\text{volume \%})$$

<Tensile Strength>

A prepared sheet-shaped crosslinked product was punched out in a No. 3 dumbbell shape to obtain a specimen. The tensile strength of the obtained specimen at 23° C. was then measured in accordance with JIS K6251. A higher tensile strength indicates that blister destruction and swelling destruction are less likely to occur.

<Dissolved Hydrogen Amount>

A prepared sheet-shaped crosslinked product was exposed to hydrogen at 90 MPa for 24 hours. Change in the released amount of hydrogen over time was then measured for the hydrogen-exposed specimen by gas chromatography using a temperature programmed desorption gas analyzer having a temperature of 30° C. The obtained hydrogen release profile was approximated by the following equation with the saturated hydrogen amount and the diffusion coefficient as unknown constants, and the hydrogen amount at t=0 was extrapolated to measure the dissolved hydrogen amount. A smaller dissolved hydrogen amount indicates that blister destruction is less likely to occur.

$$C_{H,R}(t) = \frac{32}{\pi^2} \times C_{H0} \times \left\{ \sum_{n=0}^{\infty} \frac{\exp\left[-(2n+1)^2 \pi^2 Dt/l^2\right]}{(2n+1)^2} \right\} \times \left\{ \sum_{n=1}^{\infty} \frac{\exp\left[-D\beta_n^2 t/\rho^2\right]}{\beta_n^2} \right\}$$

t: Time elapsed after decompression
$C_{H,R}(t)$: Residual hydrogen amount at time t
$C_{H0}$: Equilibrium hydrogen amount
D: Diffusion coefficient
ρ: Radius of columnar specimen after hydrogen exposure
l: Thickness of columnar specimen after hydrogen exposure
$β_n$: Root of zero-order Bessel function <Degree of Volume Swelling>

Using a full-area measurement two-dimensional multi-point size meter (produced by Keyence Corporation; product name: TM-3000) adjusted to have a temperature of 30° C., the area of a two-dimensional silhouette image of a prepared sheet-shaped crosslinked product was measured and the square root of the measured area was cubed to calculate the volume V0 of the specimen prior to a hydrogen exposure test. After exposing the specimen to hydrogen at 90 MPa for 24 hours, the maximum volume Vm of the hydrogen-exposed specimen was calculated from the area of a two-dimensional silhouette image using the full-area measurement two-dimensional multi-point size meter (produced by Keyence Corporation; product name: TM-3000) adjusted to have a temperature of 30° C., and Vm was divided by V0 to measure the degree of volume swelling Vm/V0. A smaller degree of volume swelling indicates that swelling destruction is less likely to occur.

Example 1

<Preparation of Fibrous Carbon Nanostructures Including Single-Walled Carbon Nanotubes>

Carbon nanotubes (SGCNTs) were prepared as fibrous carbon nanostructures by the super growth method in accordance with the description in WO 2006/011655 A1. In the preparation of the SGCNTs, formation of a catalyst layer on the surface of a substrate was performed by a wet process and a feedstock gas having acetylene as a main component was used.

The obtained SGCNTs were mainly single-walled CNTs and upon measurement thereof using a Raman spectrophotometer, a spectrum having a radial breathing mode (RBM) in a low wavenumber region of 100 $cm^{-1}$ to 300 $cm^{-1}$, which is characteristic of single-walled CNTs, was observed. The BET specific surface area of the SGCNTs as measured using a BET specific surface area meter (BELSORP®-max produced by Bel Japan Inc.) was 1,050 $m^2/g$ (unopened). The diameters and lengths of 100 randomly selected SGCNTs were measured using a transmission electron microscope, and the average diameter (Av), the diameter standard deviation (σ), and the average length of the SGCNTs were determined. The average diameter (Av) was 3.3 nm, a value 3σ obtained by multiplying the standard deviation (σ) by 3 was 1.9 nm, the ratio thereof (3σ/Av) was 0.58, and the average length was 500 μm. A t-plot of the SGCNTs measured using a BELSORP®-mini (produced by Bel Japan Inc.) was bent with a convex upward shape. S2/S1 was 0.09 and the position t of the bending point was 0.6 nm.

<Preparation of Composition for Gas Seal Member>
[Preparation of Mixture (Masterbatch)]

An acrylonitrile butadiene rubber solution was obtained by adding 100 g of acrylonitrile butadiene rubber (Nipol 1024 produced by Zeon Corporation) as an elastomer to 1,900 g of methyl ethyl ketone as an organic solvent and then dissolving the acrylonitrile butadiene rubber under stirring for 24 hours. The Mooney viscosity ($ML_{1+4}$, 100° C.) of the acrylonitrile butadiene rubber as measured in accordance with JIS K6300 was 77.5.

Next, 8 g of the SGCNTs were added to the obtained acrylonitrile butadiene rubber solution and were stirred therewith for 15 minutes using a stirrer (LABOLUTION® (LABOLUTION is a registered trademark in Japan, other countries, or both) produced by PRIMIX Corporation). A wet jet mill (L-ES007 produced by Yoshida Kikai Co., Ltd.) was used to perform dispersing treatment of the solution to which the SGCNTs had been added at 90 MPa (slurry preparation step). The dispersion-treated liquid (slurry) that was obtained was subsequently added dropwise to 4,000 g of isopropyl alcohol to cause coagulation and obtain a black solid. The black solid was dried under reduced pressure at 60° C. for 12 hours to yield a mixture (masterbatch) of acrylonitrile butadiene rubber and SGCNTs.

[Kneading]

A composition for a gas seal member was subsequently obtained by using a 50° C. open roll mill to knead 108 g of the mixture (masterbatch) containing 100 g of acrylonitrile butadiene rubber and 8 g of SGCNTs, 5 g of zinc oxide (flowers of zinc No. 1) as a crosslinking aid, 1 g of stearic acid (produced by NOF Corporation; product name: STEARIC ACID CAMELLIA), 1.5 g of 325 mesh sulfur as a crosslinking agent, 0.5 g of tetramethylthiuram disulfide (TMTD; produced by Ouchi Shinko Chemical Industrial Co., Ltd.; product name: NOCCELER TT; crosslinking promoter), and 0.5 g of di-2-benzothiazolyl disulfide (MBTS; produced by Ouchi Shinko Chemical Industrial Co., Ltd.; product name: NOCCELER DM; crosslinking promoter).

The obtained composition for a gas seal member was used to measure the area fraction S (%) of aggregates of the fibrous carbon nanostructures in a cross-section of the composition for a gas seal member and the volume percentage V (volume %) of the fibrous carbon nanostructures in the composition for a gas seal member. The results are shown in Table 1.

<Preparation of Sheet-Shaped Crosslinked Product>

The obtained elastomer composition was loaded into a mold and was subjected to 10 minutes of crosslinking at a temperature of 160° C. and a pressure of 10 MPa to obtain a sheet-shaped crosslinked product (length: 150 mm; width: 150 mm; thickness: 2 mm).

The obtained sheet-shaped crosslinked product was used to measure the tensile strength, the dissolved hydrogen amount, and the degree of volume swelling of the crosslinked product. The results are shown in Table 1.

Example 2

A sheet-shaped crosslinked product was prepared in the same way as in Example 1 with the exception that preparation of a composition for a gas seal member was carried out as described below. Evaluations were conducted in the same manner as in Example 1. The results are shown in Table 1.

<Preparation of Composition for Gas Seal Member>
[Preparation of Mixture (Primary Masterbatch)]

An acrylonitrile butadiene rubber solution was obtained by adding 40 g of nitrile rubber (acrylonitrile butadiene rubber; Nipol 1024 produced by Zeon Corporation) as an elastomer to 760 g of methyl ethyl ketone as an organic solvent and then dissolving the acrylonitrile butadiene rubber under stirring for 24 hours. The Mooney viscosity ($ML_{1+4}$, 100° C.) of the acrylonitrile butadiene rubber as measured in accordance with JIS K6300 was 77.5.

Next, 8 g of the SGCNTs were added to the obtained acrylonitrile butadiene rubber solution and were stirred therewith for 15 minutes using a stirrer (LABOLUTION® produced by PRIMIX Corporation). A wet jet mill (L-ES007 produced by Yoshida Kikai Co., Ltd.) was used to perform dispersing treatment of the solution to which the SGCNTs had been added at 90 MPa (slurry preparation step). The dispersion-treated liquid (slurry) that was obtained was subsequently added dropwise to 1,600 g of isopropyl alcohol to cause coagulation and obtain a black solid. The black solid was dried under reduced pressure at 60° C. for 12 hours to yield a mixture (primary masterbatch) of acrylonitrile butadiene rubber and SGCNTs.

[Kneading]

Thereafter, a 50° C. open roll mill was used to knead 48 g of the mixture (primary masterbatch) containing 40 g of acrylonitrile butadiene rubber and 8 g of SGCNTs with 30 g of acrylonitrile butadiene rubber for 5 minutes to prepare a secondary masterbatch (product for which the mass (A: 48 g) of the mixture (primary masterbatch) prior to elastomer addition and the mass (B: 30 g) of elastomer added to the mixture (primary masterbatch) satisfied a relationship 0.45≤A/(A+B)<1). Note that in this case, A/(A+B)=48/(48+30)=0.62.

In addition, a 50° C. open roll mill was used to knead 78 g of the mixture (secondary masterbatch) containing 70 g of acrylonitrile butadiene rubber and 8 g of SGCNTs with 30 g of acrylonitrile butadiene rubber for 5 minutes to prepare a tertiary masterbatch (product for which the mass (A: 78 g) of the mixture (secondary masterbatch) prior to elastomer addition and the mass (B: 30 g) of elastomer added to the mixture (secondary masterbatch) satisfied a relationship 0.45≤A/(A+B)<1). Note that in this case, A/(A+B)=78/(78+30)=0.72.

A composition for a gas seal member was subsequently obtained by kneading the mixture (tertiary masterbatch) containing 100 g of acrylonitrile butadiene rubber and 8 g of SGCNTs, 5 g of zinc oxide (flowers of zinc No. 1) as a crosslinking aid, 1 g of stearic acid (produced by NOF Corporation; product name: STEARIC ACID CAMELLIA), 1.5 g of 325 mesh sulfur as a crosslinking agent, 0.5 g of tetramethylthiuram disulfide (TMTD; produced by Ouchi Shinko Chemical Industrial Co., Ltd.; product name: NOC-CELER TT; crosslinking promoter), and 0.5 g of di-2-benzothiazolyl disulfide (MBTS; produced by Ouchi Shinko Chemical Industrial Co., Ltd.; product name: NOCCELER DM; crosslinking promoter).

The obtained composition for a gas seal member was used to measure the area fraction S (%) of aggregates of the fibrous carbon nanostructures in a cross-section of the composition for a gas seal member and the volume percentage V (volume %) of the fibrous carbon nanostructures in the composition for a gas seal member.

Comparative Example 1

A sheet-shaped crosslinked product was prepared in the same way as in Example 2 with the exception that kneading in preparation of a composition for a gas seal member was carried out as described below. Evaluations were conducted in the same manner as in Example 2. The results are shown in Table 1.

[Kneading]

A 50° C. open roll mill was used to knead 48 g of the mixture (primary masterbatch) containing 40 g of acrylonitrile butadiene rubber and 8 g of SGCNTs with 60 g of acrylonitrile butadiene rubber for 10 minutes to prepare a secondary masterbatch (product for which the mass (A: 48 g) of the mixture (primary masterbatch) prior to elastomer addition and the mass (B: 60 g) of elastomer added to the mixture (primary masterbatch) did not satisfy a relationship 0.45≤A/(A+B)<1). Note that in this case, A/(A+B)=48/(48+60)=0.44.

A composition for a gas seal member was subsequently obtained by kneading the mixture (secondary masterbatch) containing 100 g of acrylonitrile butadiene rubber and 8 g of SGCNTs, 5 g of zinc oxide (flowers of zinc No. 1) as a crosslinking aid, 1 g of stearic acid (produced by NOF Corporation; product name: STEARIC ACID CAMELLIA), 1.5 g of 325 mesh sulfur as a crosslinking agent, 0.5 g of tetramethylthiuram disulfide (TMTD; produced by Ouchi Shinko Chemical Industrial Co., Ltd.; product name: NOC-CELER TT; crosslinking promoter), and 0.5 g of di-2-benzothiazolyl disulfide (MBTS; produced by Ouchi Shinko Chemical Industrial Co., Ltd.; product name: NOCCELER DM; crosslinking promoter).

The obtained composition for a gas seal member was used to measure the area fraction S (%) of aggregates of the fibrous carbon nanostructures in a cross-section of the composition for a gas seal member and the volume percentage V (volume %) of the fibrous carbon nanostructures in the composition for a gas seal member.

Comparative Example 2

A composition for a gas seal member and a sheet-shaped crosslinked product were prepared in the same way as in Comparative Example 1 with the exception that in preparation of the composition for a gas seal member of Comparative Example 1, the kneading time of 48 g of the primary masterbatch and 60 g of acrylonitrile butadiene rubber was changed from 10 minutes to 2 minutes. Evaluations were conducted in the same manner as in Comparative Example 1. The results are shown in Table 1.

TABLE 1

| | | | Units | Example 1 | Example 2 | Comparative Example 1 | Comparative Example 2 |
|---|---|---|---|---|---|---|---|
| Elastomer composition | Elastomer | Nitrile rubber (Nipol 1042) | Parts by mass | 100 | 100 | 100 | 100 |
| | Fibrous carbon nanostructures | Single-walled carbon nanotubes (SGCNTs) | Parts by mass | 8 | 8 | 8 | 8 |
| | | Nipol 1042/SGCNTs 20 phr Primary masterbatch | Parts by mass | — | 48 | 48 | 48 |
| | | Nipol 1042/SGCNTs 8 phr Primary masterbatch | Parts by mass | 108 | — | — | — |
| | | Addition of elastomer to primary masterbatch (secondary masterbatch obtained through addition of elastomer) | Parts by mass | 0 | 30 | 60 | 60 |

TABLE 1-continued

|  |  |  | Units | Example 1 | Example 2 | Comparative Example 1 | Comparative Example 2 |
|---|---|---|---|---|---|---|---|
|  | Addition of elastomer to secondary masterbatch (tertiary masterbatch obtained through addition of elastomer) |  | Parts by mass | 0 | 30 | 0 | 0 |
|  | Mass ratio before and after addition of elastomer to primary masterbatch (A/(A + B)) |  | — | — | 0.62 | 0.44 | 0.44 |
|  | Mass ratio before and after addition of elastomer to secondary masterbatch (A/(A + B)) |  | — | — | 0.72 | — | — |
|  | Crosslinking agent/ Crosslinking aid | Zinc oxide | Parts by mass | 5 | 5 | 5 | 5 |
|  |  | Stearic acid | Parts by mass | 1 | 1 | 1 | 1 |
|  |  | Sulfur | Parts by mass | 1.5 | 1.5 | 1.5 | 1.5 |
|  |  | TMTD | Parts by mass | 0.5 | 0.5 | 0.5 | 0.5 |
|  |  | MBTS | Parts by mass | 0.5 | 0.5 | 0.5 | 0.5 |
|  | Dispersion | CNT area fraction S | % | 0.5 | 1.5 | 10.9 | 20 |
|  |  | CNT volume percentage V | vol % | 4.4 | 4.4 | 4.4 | 4.4 |
|  |  | S/V | — | 0.11 | 0.34 | 2.48 | 4.54 |
| Evaluation results | Physical properties | Tensile strength | MPa | 30.5 | 30.0 | 23.5 | 16.9 |
|  |  | Dissolved hydrogen amount | wt · ppm | 1500 | 1530 | 1648 | 1601 |
|  |  | Degree of volume swelling | — | 1.13 | 1.17 | 1.25 | 1.34 |

It can be seen from Table 1 that for the compositions for gas seal members of Examples 1 and 2, which each contained fibrous carbon nanostructures in a proportion of not less than 1 part by mass and not more than 10 parts by mass per 100 parts by mass of an elastomer and satisfied the relationship $0 \leq S/V \leq 2.0$, both swelling destruction and blister destruction of obtained gas seal members were sufficiently inhibited compared to in Comparative Examples 1 and 2 in which the relationship $0 \leq S/V \leq 2.0$ was not satisfied. In other words, the degree of volume swelling was small and tensile strength was high.

Note that it can be deduced that "swelling destruction" can be inhibited because the tensile strength is high and the degree of volume swelling is small, whereas it can be deduced that "blister destruction" can be inhibited because the tensile strength is high, the degree of volume swelling is small, and the dissolved hydrogen amount is low.

Moreover, Comparative Examples 1 and 2 differed only in terms of the kneading time and, even in the case of Comparative Example 1 in which a longer kneading time was adopted, it was only possible to achieve dispersibility of a level such that S/V=2.48.

As a result of hydrogen not being adsorbed by (dissolving in) the CNTs and the degree of volume swelling being small (aggregates of the order of micrometers not observed using an optical microscope), a low dissolved hydrogen amount and degree of volume swelling can be maintained through addition of the CNTs to the elastomer composition.

Although there does not seem to be any significant difference between the evaluation results (tensile strength, dissolved hydrogen amount, and degree of volume swelling) for Examples 1 and 2, the process cost of preparing the primary masterbatch in Example 2 was roughly 40% of the process cost of preparing the primary masterbatch in Example 1, and thus Example 2 is more advantageous than Example 1 in terms of process cost.

INDUSTRIAL APPLICABILITY

According to the present disclosure, it is possible to provide a composition for a gas seal member that can form a gas seal member for a high-pressure hydrogen device that is capable of sufficiently inhibiting both swelling destruction and blister destruction, and also to provide a method of producing this composition for a gas seal member.

Moreover, according to the present disclosure, it is possible to provide a gas seal member for a high-pressure hydrogen device that can sufficiently inhibit both swelling destruction and blister destruction.

Furthermore, according to the present disclosure, it is possible to provide a high-pressure hydrogen device in which swelling destruction and blister destruction of a gas seal member are sufficiently inhibited.

REFERENCE SIGNS LIST

100 hydrogen station
111 hydrogen generator
111A fuel reformer
111B hydrogen purifier
112 hydrogen gas compressor (pressurizing device)
113 gas accumulator (pressure accumulator)
114 dispenser
115 hydrogen supply hose
116 hydrogen supply plug
117 release coupling
118 hydrogen pipe
120 vehicle (fuel cell vehicle)
121 receptacle

The invention claimed is:

1. A method of producing a composition for a gas seal member used in a high-pressure hydrogen environment, the method comprising:
   a slurry preparation step of preparing a slurry containing an elastomer, fibrous carbon nano structures, and a solvent or dispersion medium;
   a removal step of removing the solvent or dispersion medium from the slurry to obtain a mixture of elastomer and fibrous carbon nanostructures; and
   a kneading step including two or more and seven or fewer kneading operations of adding and kneading additional elastomer with the mixture of elastomer and fibrous carbon nanostructures after the removal step to obtain the composition for a gas seal member, wherein the kneading step includes two or more and seven or fewer kneading operations in which mass (A) of a mixture prior to elastomer addition and mass (B) of elastomer added to the mixture satisfy a relationship $0.45 \leq A/(A+B) < 1$, wherein
   the fibrous carbon nanostructures are contained in the composition for a gas seal member in a proportion of not less than 1 part by mass and not more than 10 parts by mass per 100 parts by mass of the elastomer, and an area fraction S, in units of %, of aggregates of the fibrous carbon nanostructures in a cross-section of the composition for a gas seal member and a volume percentage V, in units of volume %, of the fibrous carbon nanostructures in the composition for a gas seal member satisfy a relationship $0 \leq S/V \leq 2.0$.

2. The method of producing a composition for a gas seal member according to claim 1, wherein the elastomer is nitrile rubber, hydrogenated nitrile rubber, or fluororubber.

3. The method of producing a composition for a gas seal member according to claim 1, wherein the fibrous carbon nanostructures have an average diameter of not less than 1 nm and not more than 60 nm.

4. The method of producing a composition for a gas seal member according to claim 1, wherein the fibrous carbon nanostructures include single-walled carbon nanotubes.

5. A gas seal member for a high-pressure hydrogen device comprising the composition for a gas seal member produced by the method according to claim 1.

6. The gas seal member for a high-pressure hydrogen device according to claim 5, used in a state in contact with high-pressure hydrogen having a pressure of not lower than 35 MPa and not higher than 105 MPa.

7. A high-pressure hydrogen device comprising:
a container filled with high-pressure hydrogen having a pressure of not lower than 35 MPa and not higher than 105 MPa; and
the gas seal member for a high-pressure hydrogen device according to claim 6, in contact with the high-pressure hydrogen in the container.

\* \* \* \* \*